United States Patent
Middelberg

(10) Patent No.: US 10,155,422 B2
(45) Date of Patent: Dec. 18, 2018

(54) TEMPERATURE COMPENSATED SELF-INFLATING TIRE SYSTEM

(71) Applicant: THE GOODYEAR TIRE & RUBBER COMPANY, Akron, OH (US)

(72) Inventor: Jason Mark Middelberg, Napier (NZ)

(73) Assignee: The Goodyear Tire & Rubber Company, Akron, OH (US)

(*) Notice: Subject to any disclaimer, the term of this patent is extended or adjusted under 35 U.S.C. 154(b) by 530 days.

(21) Appl. No.: 14/791,878

(22) Filed: Jul. 6, 2015

(65) Prior Publication Data
US 2016/0059644 A1    Mar. 3, 2016

Related U.S. Application Data

(60) Provisional application No. 62/042,849, filed on Aug. 28, 2014.

(51) Int. Cl.
| | |
|---|---|
| *B60C 29/00* | (2006.01) |
| *B60C 29/04* | (2006.01) |
| *B60C 29/06* | (2006.01) |
| *B60C 23/12* | (2006.01) |

(52) U.S. Cl.
CPC ............ *B60C 29/002* (2013.01); *B60C 23/12* (2013.01)

(58) Field of Classification Search
CPC ......... B60C 23/10; B60C 23/12; B60C 29/00; B60C 29/04; B60C 29/06; B60C 29/066
See application file for complete search history.

(56) References Cited

U.S. PATENT DOCUMENTS

2013/0048178 A1    2/2013  Hinque

OTHER PUBLICATIONS

Thermo Variable rate springs : A new concept for Thermal Sensor-Actuators, Waram Stoeckel, Springs—The magazine of Spring Technology, vol. 30, Nr. 2, pp. 35-42, 1991.

*Primary Examiner* — Justin R Fischer
(74) *Attorney, Agent, or Firm* — June E. Rickey

(57) ABSTRACT

A self-inflating tire assembly includes an adjustable valve having: a housing having first end and a second end, and a central bore which extends from the first end to the second end; a piston slidably mounted within the central bore at the first end of the housing, a cap mounted in the second end of the housing forming a chamber with the housing, wherein a spring is mounted within the chamber and having a first end for engagement with the piston and a second end for engagement with a bottom wall of the chamber, said cap further comprising a fluid chamber projecting from the bottom wall of the chamber, wherein the piston is movable to seal the fluid chamber, wherein the housing is made from a material having a higher coefficient of thermal expansion than the material of the fluid chamber.

9 Claims, 9 Drawing Sheets

TEMPERATURE COMPENSATED SELF-INFLATING TIRE SYSTEM

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

Self-inflating tire systems regulates the tire pressure. One problem is that the pressure of a tire changes with temperature. This may be due to the temperature increase due to the rise in ambient temperature, the operation of the tire, hysteresis losses, and as a result in the increase in vehicle speed. Generally, self-inflating tire systems allow inflation of a tire when the tire cavity pressure falls below a selected value. This selected value may not account for the increase in temperature. If the temperature rise is significant from an increase due to ambient temperature or vehicle speed, the system may not inflate the tire resulting in an underinflated tire. Thus it is desired to provide a temperature compensated pressure regulation system for air maintenance tires.

SUMMARY OF THE INVENTION

The invention provides in a first aspect a self-inflating tire assembly comprising a tire mounted to a rim, the tire having a tire cavity, and first and second sidewalls extending respectively from first and second tire bead regions to a tire tread region. The assembly further includes an air tube connected to the tire and defining an air passageway, the air tube being composed of a flexible material operative to allow a portion of the air tube segment near a tire footprint to substantially close the annular passageway. The assembly further includes an inlet regulator device connected to an inlet end of the air tube, the inlet regulator device includes an insert mounted in the tire, wherein the insert has a bore therethrough having a first end located in the tire cavity, and a second end which extends through the tire, wherein a pressure membrane is received within the first end of the insert, and a regulator body is received within the second end of the insert, wherein the regulator body has an interior passageway which extends from a first end to a distal end, wherein the distal end extends into a cavity of the insert, wherein the pressure membrane is responsive to the cavity tire pressure and the outside air pressure, wherein the pressure membrane is positioned for engagement with the distal end of the regulator body when the tire pressure reaches a set value.

The invention provides in a second aspect a self-inflating tire assembly comprising a tire mounted to a rim, the tire having a tire cavity, and first and second sidewalls extending respectively from first and second tire bead regions to a tire tread region. The invention further includes an air tube connected to the tire and defining an air passageway, the air tube being composed of a flexible material operative to allow a portion of the air tube segment near a tire footprint to substantially close the annular passageway. The assembly also has an inlet regulator device connected to an inlet end of the air tube, the inlet regulator device includes an insert mounted in the tire, wherein the insert has a bore therethrough having a first end located in the tire cavity, a middle portion forming a chamber, and a second end which extends through the tire and which is in fluid communication with the outside air and the chamber, wherein a piston is slidably mounted within the first end of the insert, and a regulator body is received within the chamber and positioned to engage a stop, the chamber having a hole for fluid communication with a pump inlet air tube, a spring mounted within the chamber and having a first end for engagement with the piston and a second end for engagement with a bottom wall of the chamber wherein the regulator body has a interior passageway which extends from a first end to a distal end, wherein the distal end extends into a cavity of the insert.

BRIEF DESCRIPTION OF THE DRAWINGS

The invention will be described by way of example and with reference to the accompanying drawings in which.

DETAILED DESCRIPTION OF THE INVENTION

Figure 1:
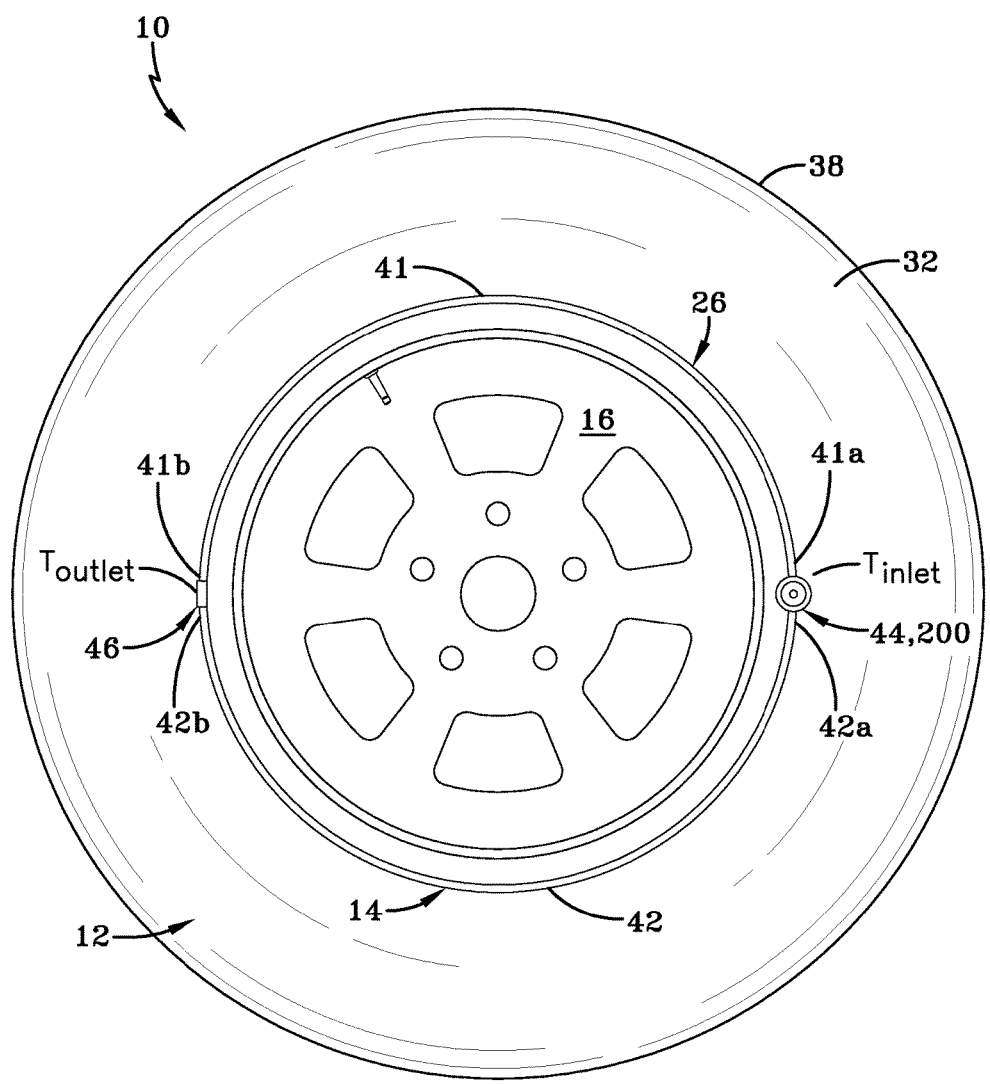
FIG. 1 is a front view of tire and rim assembly showing two peristaltic pump assemblies.
Figure 4:
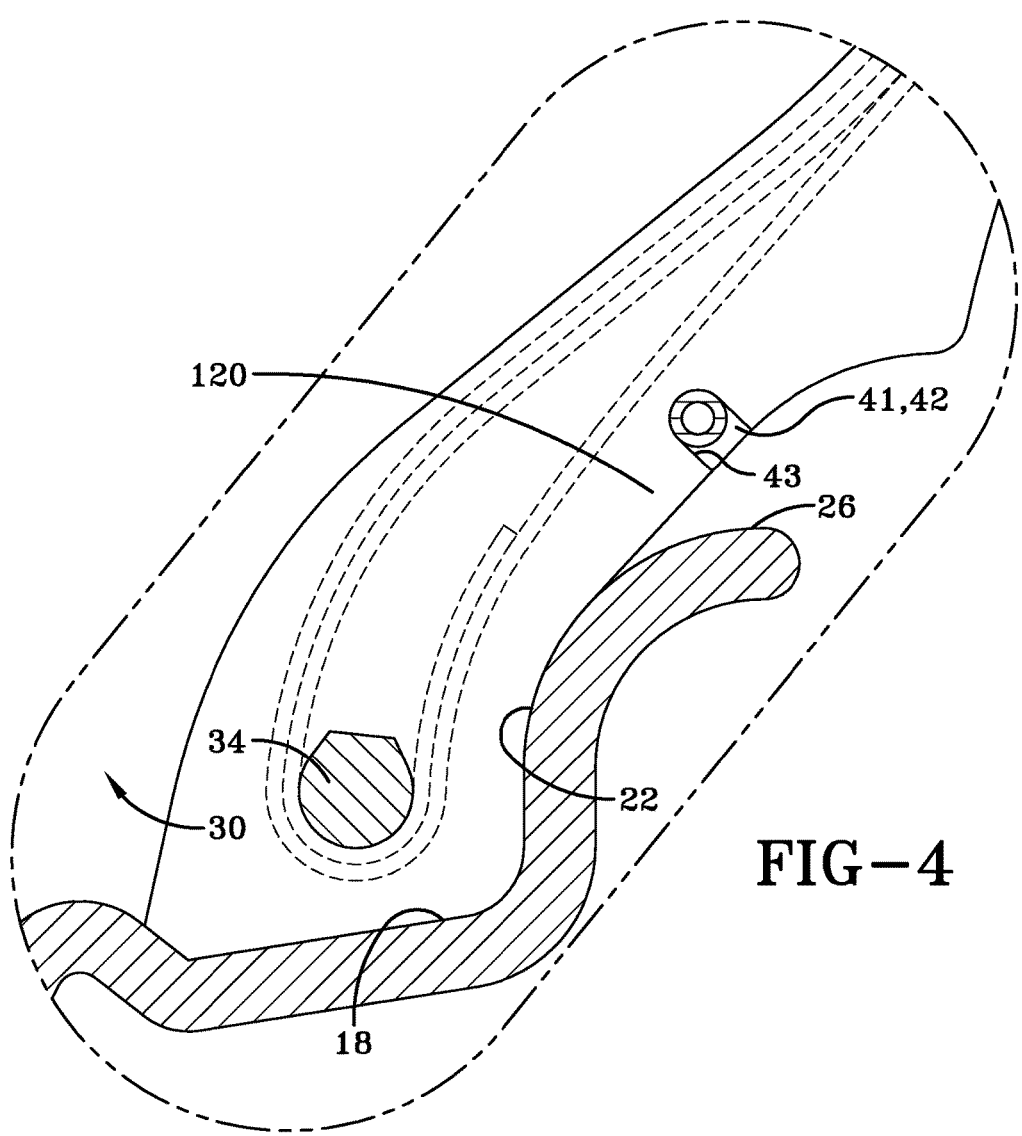
FIG. 4 is a partial section view through the tire in the bead area showing the pump tube location next to the rim.
Figure 5:
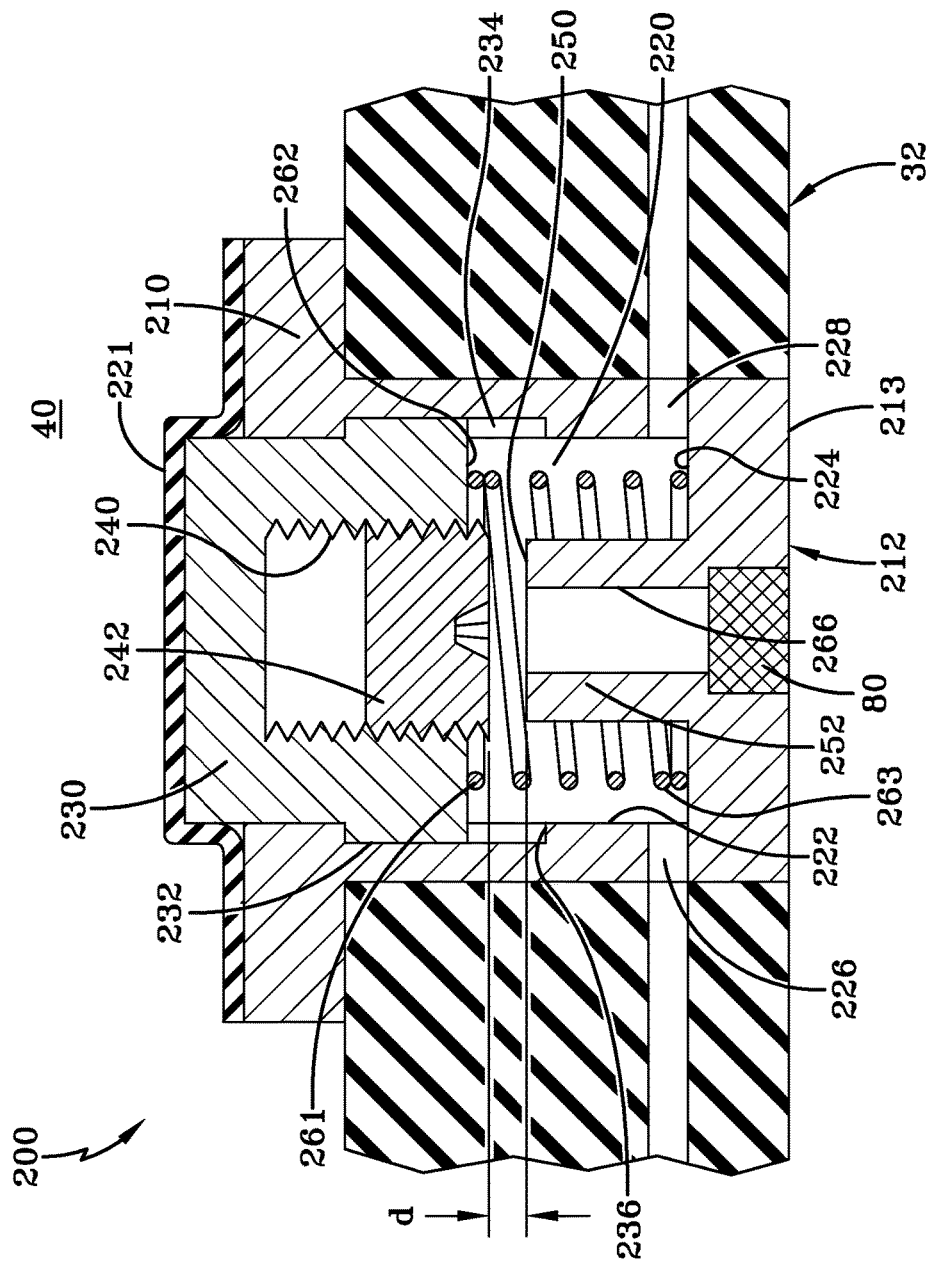
FIG. 5 is a cross-sectional view of a first embodiment of a pressure regulator.
Figure 6:
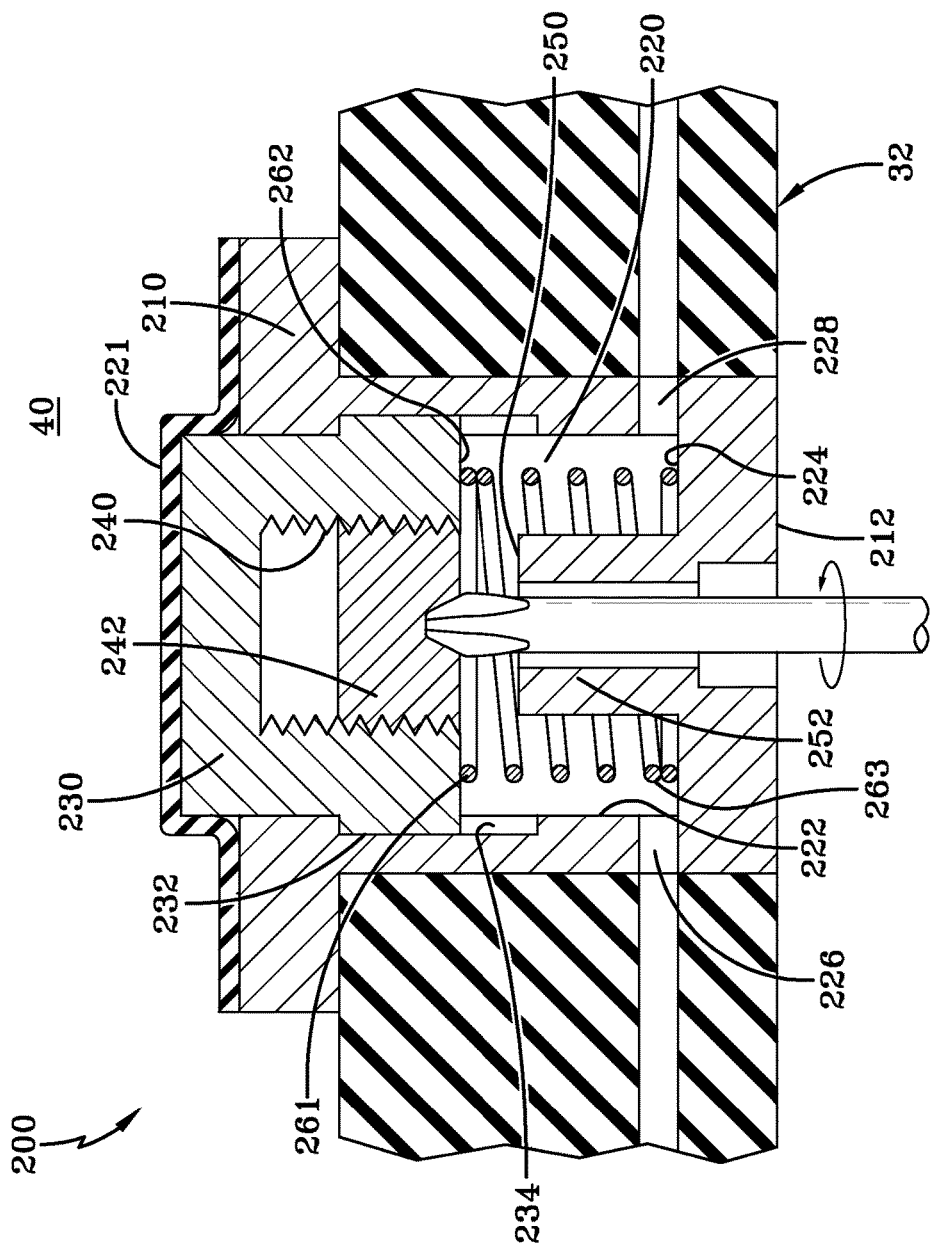
FIG. 6 is a cross-sectional view of the pressure regulator of FIG. 5 showing the adjustability feature.

Referring to FIGS. 1 and 4, a tire assembly 10 includes a tire 12, a peristaltic pump assembly 14, and a tire rim 16. The tire mounts in a conventional fashion to a pair of rim mounting surfaces 18 located adjacent outer rim flanges 22. The outer rim flanges 22 have an outer rim surface 26. The tire is of conventional construction, having a pair of sidewalls 30,32 extending from opposite bead areas 34,36 to a crown or tire tread region 38. The tire and rim enclose a tire cavity 40.

As shown in FIG. 1, the peristaltic pump assembly 14 includes a first and second pump 41,42 that are mounted in a passageway 43 located in the sidewall area of the tire, preferably near the bead region. The air passageway is preferably molded into the sidewall of the tire during vulcanization and is preferably annular in shape. Each pump 41,42 has a first end 41a,42a joined together by an inlet device 44 and a second end 41b,42b joined together by an outlet device 46. Each pump 41,42 is comprised of a tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

Figure 2:
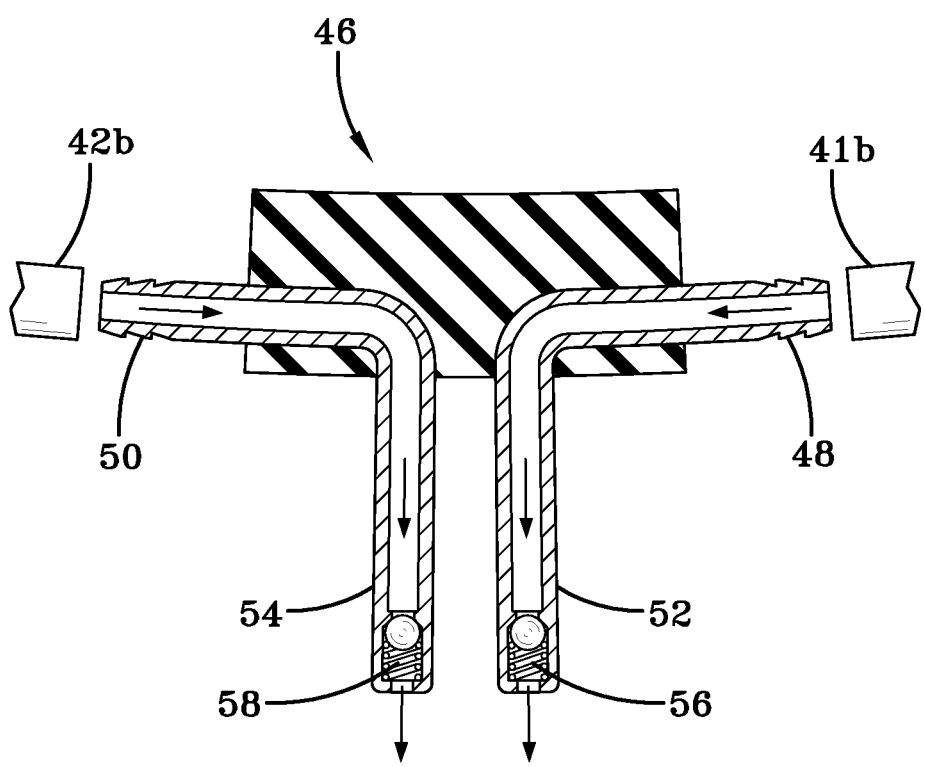
FIG. 2 is a cross-sectional view of the pump outlet mechanism.

As shown, the inlet device 44 and the outlet device 46 are spaced apart approximately 180 degrees at respective locations forming two 180 degree pumps 41,42. The inlet and outlet device may be located adjacent each other, thus forming a single 360 degree pump. Other variations may be utilized, such as 270 degrees, etc. As shown in FIGS. 3A and 3B, the outlet device 46 is a connector having a body 47 having a first port 48 that connects to pump 41 outlet end 41b. The first port 48 is in fluid communication with outlet port 52. Outlet port 52 extends into the tire cavity so that the pump end 41b is in fluid communication with the tire cavity. The outlet device further includes a second port 50 that connects to pump 42 outlet end 42b. The second port 50 is connected to an outlet port 54 that is located in the tire cavity so that the pump end 42 is in fluid communication with the tire cavity. FIG. 2 further illustrates that each outlet end 52,54 may further comprise a check valve 56,58 to prevent backflow of air into the pump. The outlet ends 52,54 of the outlet device 46 extend into the tire cavity so that the outlet ends are in fluid communication with the internal tire cavity 40.

Figure 7:
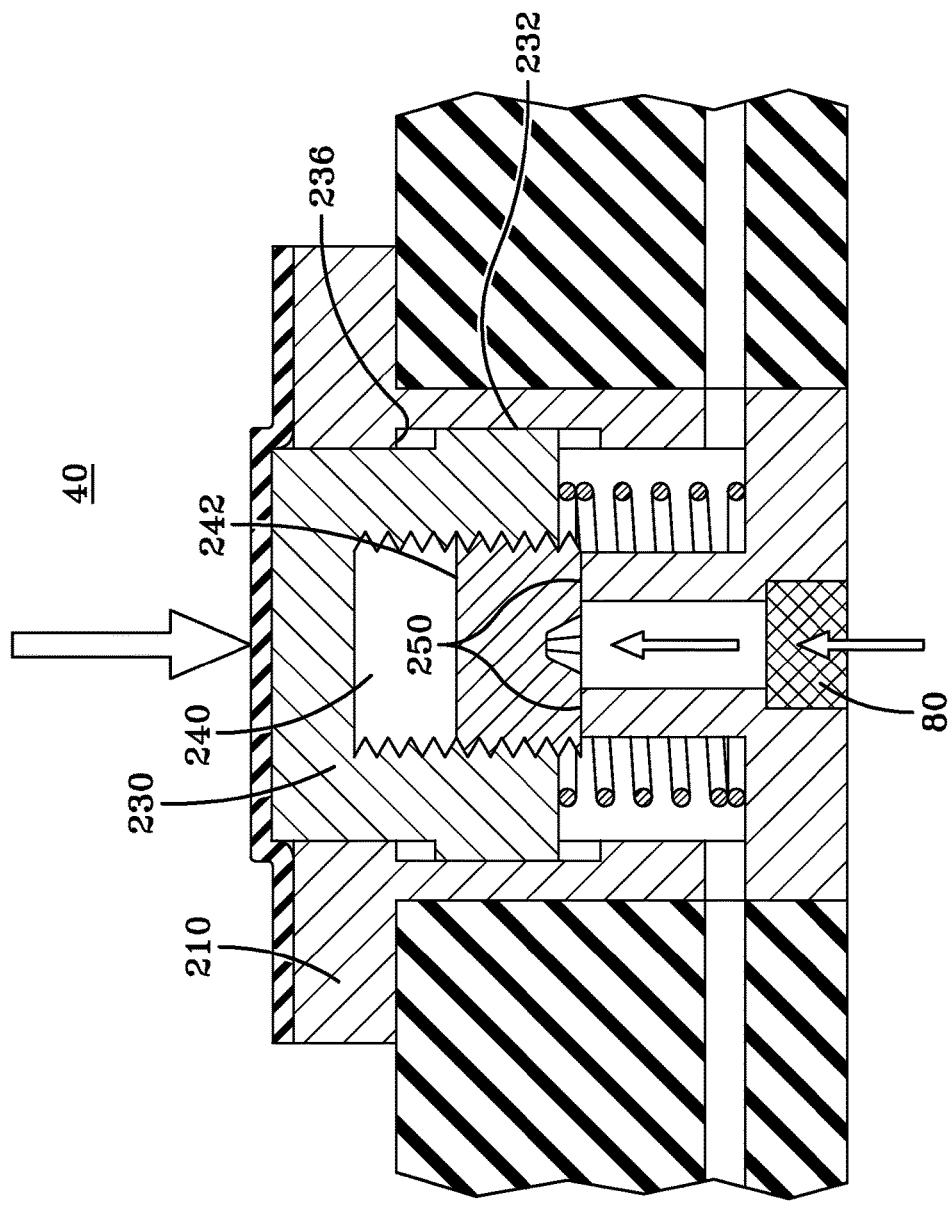
FIG. 7 is a cross-sectional view of the pressure regulator of FIG. 5 shown in operation in the closed position.
Figure 8:
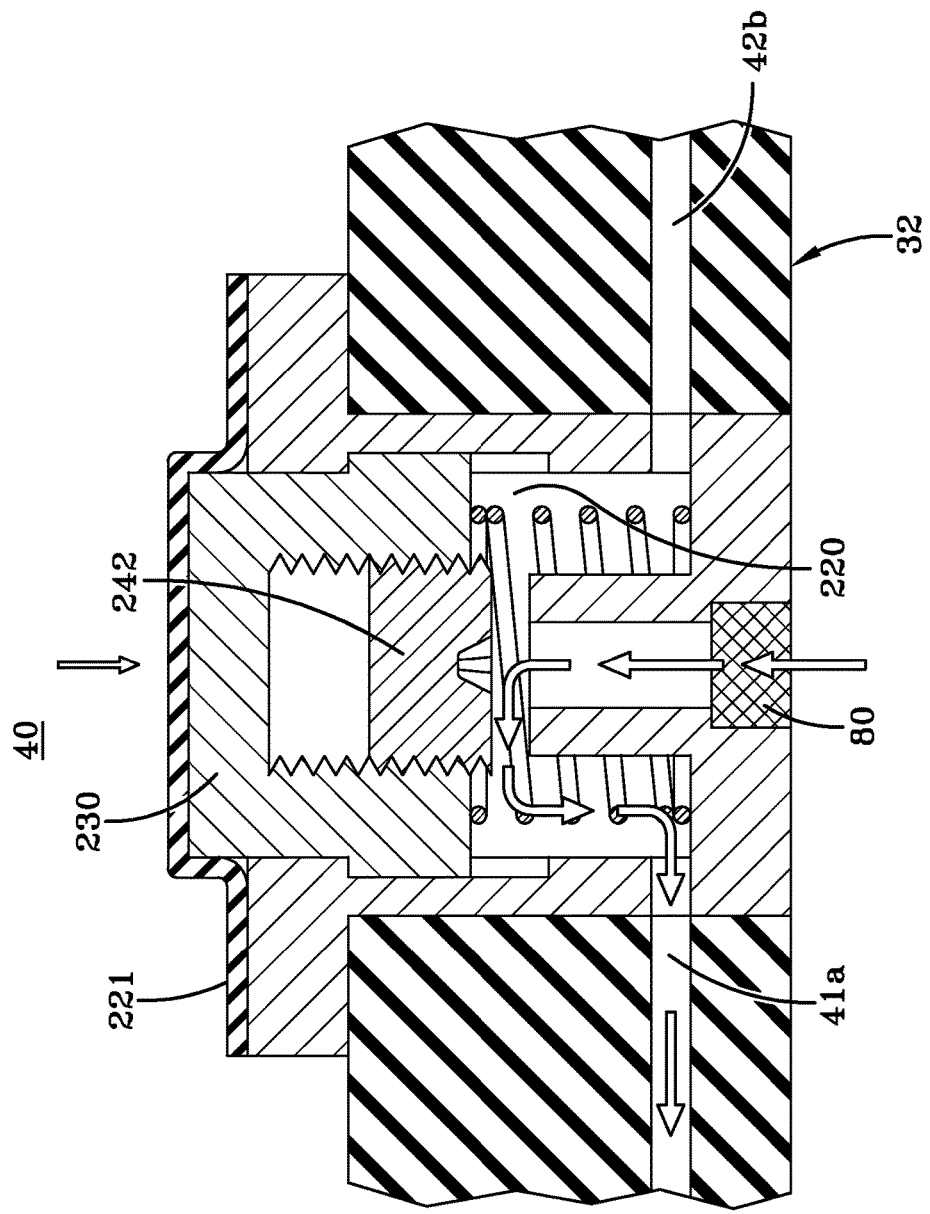
FIG. 8 is a cross-sectional view of the pressure regulator of FIG. 5 shown in operation in the open position.
Figure 9:
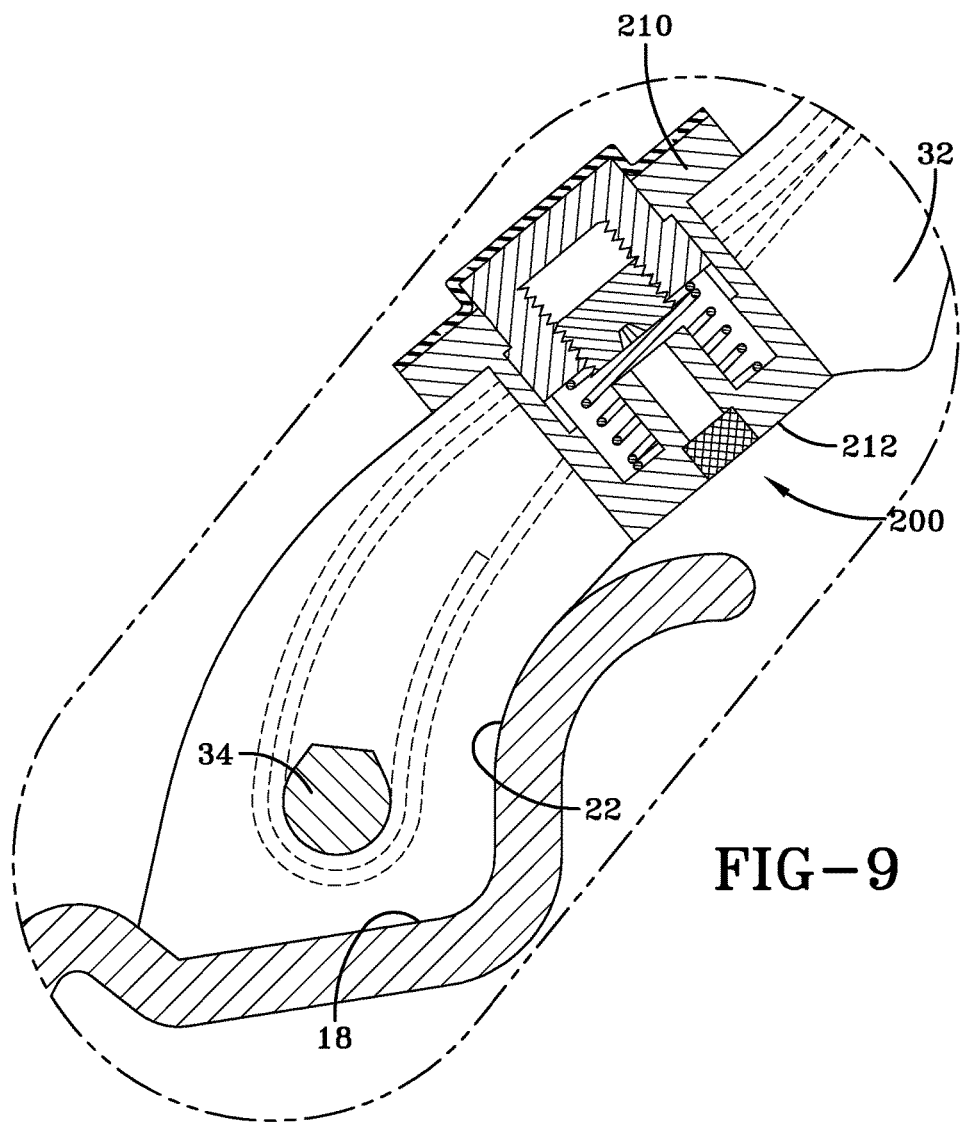
FIG. 9 is an enlarged cross sectional view of the tire and rim assembly with the pressure regulator of FIG. 5 shown mounted in the tire.

A first embodiment of a valve device 200 is shown in FIGS. 5-9. The valve device functions to regulate the inlet flow of both pumps 41,42. The valve device 200 includes an outer T shaped insert 210 that may be molded into a green tire and then cured. FIG. 9 illustrates the inlet device installed in the sidewall 32 of a tire, wherein the T shaped portion of the insert is located on the interior portion of the tire sidewall, facing the tire cavity 40. An outer cap 212 is secured to the insert. The outer cap 212 has an outer surface 213 that is preferably flush with the tire sidewall 32. The sidewalls 222 of the T shaped insert cooperates with the bottom wall 224 of the outer cap 212 to form an inner chamber 220. Two holes 226,228 are located in the inner chamber sidewall 222 for fluid communication with inlet tube ends 41,42a of the pumps 41,42.

A regulator piston 230 is slidably received within the inner chamber 220 of the insert. The regulator piston 230 has an outer flanged surface 232 which is slidably received within a slot 234 of the chamber sidewall. An outer stop 236 located on the upper chamber wall of the T shaped insert retains the piston 230 within the chamber. An optional outer membrane 221 is received over the top of the piston 230 to make the system airtight and to prevent leakage of air between the piston and the cylinder 234. The regulator piston has an interior threaded bore 240 in which an adjustable member 242 is received. The adjustable member 242 is positioned to engage an inner stop 250 located on an inlet port 252. The inlet port 252 is in fluid communication with outside air via passageway 266 in the cap. A spring 260 is positioned in the insert chamber 220 with a first end 261 engaging the piston end wall 262 and a second end 263 engaging the bottom wall of the chamber 224. The spring biases the piston and the adjustable member away from the inner stop 250.

In order to provide temperature compensated pressure regulation, the design of the valve device is as follows. The material of the T shaped insert is selected from a material to have a high coefficient of expansion, in the range of 150 to 300×10−6 m/m K, more preferably in the range of 175 to 250×10−6 m/m K. One example of a material suitable for use is polyethylene with a coefficient of thermal expansion of 200×10−6 m/m K.

It is additionally preferred that the material of the outer cap 212, including the inlet port 252 be made of a material having a low coefficient of thermal expansion. It is additionally more preferred that the material of the regulator piston 230 and the adjustable member 242, be made of a low coefficient of thermal expansion. The material may have a coefficient of thermal expansion in the range of about 50 to 150×10−6 m/m K, more preferably in the range of about 75 to about 100×10−6 m/m K.

The idea of the invention is to select two different materials, one with a high coefficient of thermal expansion and one with a low coefficient of thermal expansion in order to increase the gap distance d required for the valve to close. Temperature compensation of the pressure regulator is achieved by increasing the gap between the stop 250 and piston 242. The housing is selected to have a high coefficient of thermal expansion, while the piston regulator and adjustable member is selected to be made from materials having a low coefficient of thermal expansion. Thus the gap distance d between the stop 250 and piston 242 increases due to expansion of the housing.

In a third embodiment of the invention, the spring 260 is formed from a shape memory alloy. The spring is made from a shape memory alloy, more preferably a nickel titanium spring selected to have an austenite-martensite transition in the range of temperatures 0 degrees C. to 50 degrees C.

The operation of the system may now be described. The regulator piston 230 is responsive to the pressure in the tire cavity, the pressure in the insert chamber 220 and the spring 260. The pressure in the chamber is similar to the pressure in the outside air. When the tire pressure is sufficiently high, the regulator piston overcomes the spring force and is forced into engagement with the stop 250 of the insert, thus sealing off flow to the inlet ends of the pump, as shown in FIG. 7. As the tire pressure decreases, the spring force overcomes the force from the tire pressure, pushing the piston 230 away from the stop 250 as shown in FIG. 8, allowing outside, filtered air to enter the chamber 220 and into the inlet ends of the pumps 41,42 via side holes 226,228 in the chamber walls. The inlet regulator device 200 may be adjusted by screwing (rotating) the adjustable member 242 in either direction in order to increase or decrease the gap distance d from the distal end of the adjustable member to the stop 250, thus altering the pressure at which flow will be shut off to the pumps.

Figure 3:
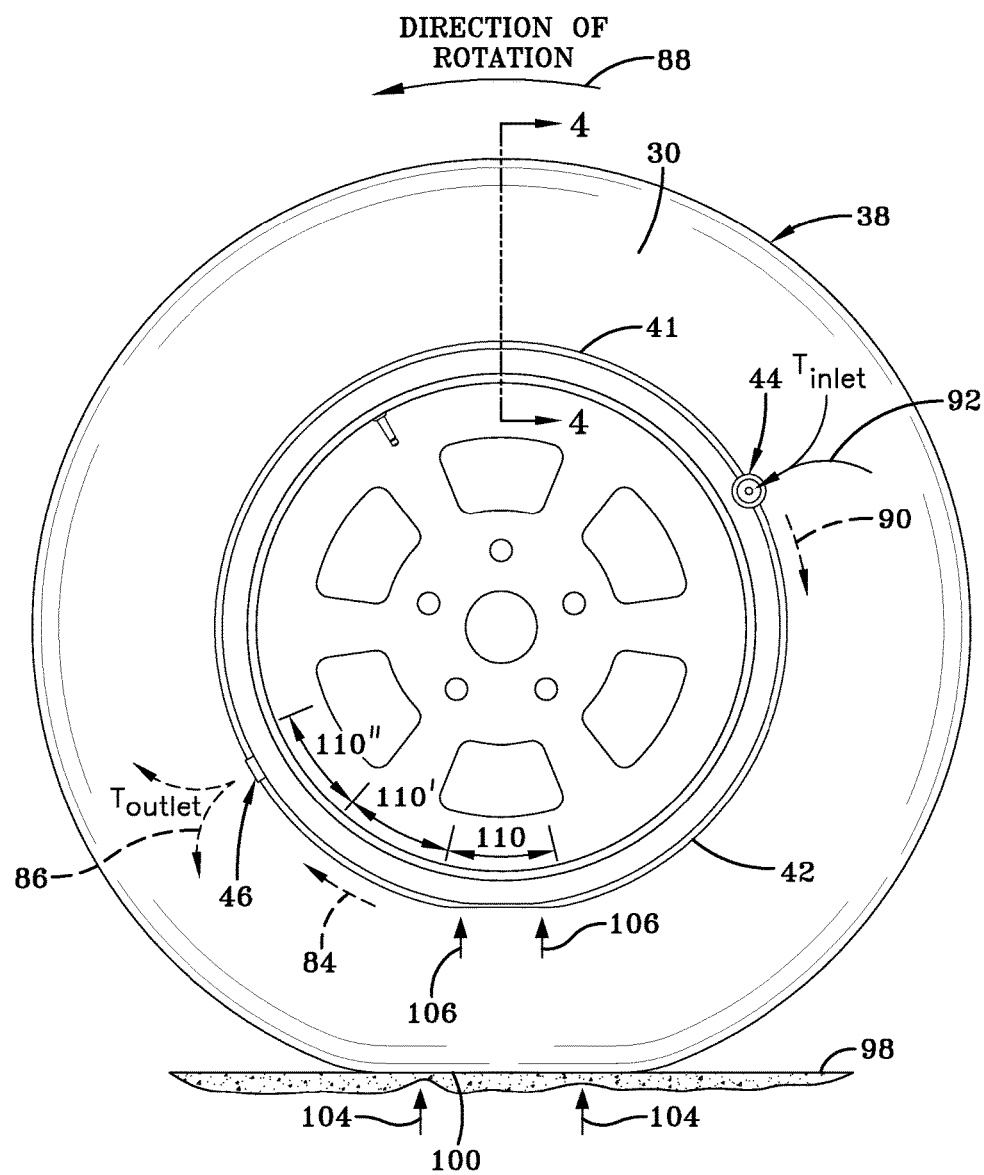
FIG. 3 illustrates the operation of the pump when the tire rotates.

As will be appreciated from FIG. 3, the inlet device 44 and the outlet device 46 are in fluid communication with the circular air tube 42 and positioned generally 180 degrees apart. As the tire rotates in a direction of rotation 88, a footprint 100 is formed against the ground surface 98. A compressive force 104 is directed into the tire from the footprint 100 and acts to flatten a segment 110 of the pump 42 a as shown at numeral 106. Flattening of the segment 110 of the pump 42 forces a portion of air located between the flattened segment 110 and the outlet device 46, in the direction shown by arrow 84 towards the outlet device 46.

As the tire continues to rotate in direction 88 along the ground surface 98, the pump tube 42 will be sequentially flattened or squeezed segment by segment in a direction 90 which is opposite to the direction of tire rotation 88. The sequential flattening of the pump tube 42 segment by segment causes the column of air located between the flattened segments to and the outlet device 46 be pumped in the direction 84 within pump 42 to the outlet device 46.

With the tire rotating in direction 88, flattened tube segments are sequentially refilled by air 92 flowing into the inlet device 44 along the pump tube 42 in the direction 90 as shown by FIG. 3. The inflow of air from the inlet device 44 in direction 90 continues until the outlet device 46, rotating counterclockwise as shown with the tire rotation 88, passes the tire footprint 100.

As the temperature of the tire rises, the thermal expansion of the T shaped insert occurs at a higher rate than the cap and piston, increasing the gap distance d between inlet port 252 and the lower surface of the piston. The major benefit of the invention is that the valve system is better able to control the set pressure of the tire, and not prematurely close (preventing inflation of the tire) due to the artificial temperature induced temperature increase.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIG. 3 to be counter-clockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a. a tire mounted to a rim, the tire having a tire cavity, first and second sidewalls extending respectively from first and second tire bead regions to a tire tread region;
   b. an air tube connected to the tire and defining an air passageway, the air tube being composed of a flexible material operative to allow a portion of the air tube segment near a tire footprint to substantially close the air passageway, and
   c. a valve device connected to an inlet end of an air tube, the valve device having a housing having first end and a second end, and a central bore which extends from the first end to the second end; a piston slidably mounted within the central bore at the first end of the housing, a cap mounted in the second end of the housing forming a chamber with the housing, wherein a spring is mounted within the chamber and having a first end for engagement with the piston and a second end for engagement with a bottom wall of the chamber, the chamber having a hole for fluid communication with a pump inlet air tube, said cap further comprising a fluid port projecting from the bottom wall of the chamber, wherein the piston is movable to seal the fluid port, wherein the housing is made from a material having a higher coefficient of thermal expansion than a material of the fluid port.

2. The self-inflating tire assembly of claim 1 wherein the housing is made from a material having a higher coefficient of thermal expansion than a material of the cap.

3. The self-inflating tire assembly of claim 1 wherein the housing is made from a material having a coefficient of thermal expansion in the range of about 150 to 300×10−6 m/m K.

4. The self-inflating tire assembly of claim 1 wherein the piston is made from a material having a coefficient of thermal expansion in the range of about 150 to 300×10−6 m/m K.

5. The self-inflating tire assembly of claim 1 wherein the piston further includes an adjustable member that is made from a material having a coefficient of thermal expansion in the range of about 150 to 300×10−6 m/m K.

6. The self-inflating tire assembly of claim 1 wherein the housing is made from a material having a higher coefficient of thermal expansion than a material of the piston.

7. The self-inflating tire assembly of claim 5 wherein the housing is made from a material having a higher coefficient of thermal expansion than the material of the adjustable member.

8. The self-inflating tire assembly of claim 1 wherein the spring is made from material having a spring force which varies with temperature in the range of 0 to 100 degrees F.

9. The self-inflating tire assembly of claim 1 wherein the spring is made from a shape memory alloy having a variable spring constant.

* * * * *